United States Patent [15] 3,696,219
Arimura et al. [45] Oct. 3, 1972

[54] CONTACT-COPYING METHOD FOR REPRODUCING A MAGNETIC TAPE

[72] Inventors: Ichiro Arimura, Kyoto; Kuozo Kurashina, Moriguchi, both of Japan

[73] Assignee: Matsushita Electric Industrial Co., Ltd., Osaka, Japan

[22] Filed: Oct. 8, 1970

[21] Appl. No.: 79,078

[30] Foreign Application Priority Data

| | | |
|---|---|---|
| Oct. 14, 1969 | Japan | 44/82448 |
| Oct. 29, 1969 | Japan | 44/87041 |
| Oct. 29, 1969 | Japan | 44/87051 |
| Dec. 11, 1969 | Japan | 44/99947 |

[52] U.S. Cl. ..................179/100.2 E, 179/100.2 MD
[51] Int. Cl. .........G11b 5/86, G11b 5/44, G11b 5/04
[58] Field of Search ..179/100.2 R, 100.2 E, 100.2 T, 179/100.2 S, 100.2 MD; 346/74 MP, 74 MT; 178/6.6 A

[56] References Cited

UNITED STATES PATENTS

| | | | |
|---|---|---|---|
| 3,472,971 | 10/1969 | Van den Berg | 179/100.2 E |
| 3,390,231 | 6/1968 | Youngquist | 179/100.2 T |
| 3,392,234 | 7/1968 | Arimura | 179/100.2 T |
| 2,629,784 | 2/1953 | Daniels | 179/100.2 MI |
| 3,230,306 | 1/1966 | Takayanagi | 179/100.2 R |
| 3,465,105 | 9/1969 | Kumada | 179/100.2 E |

*Primary Examiner*—Bernard Konick
*Assistant Examiner*—Jay P. Lucas
*Attorney*—Stevens, Davis, Miller & Mosher

[57] ABSTRACT

Contact-copying method for producing a tape copied from an original tape comprising the steps of modulating with a high-frequency carrier those low-frequency components of the information signals to be recorded which cannot be efficiently copied on the tape by the contact-copying method, recording the modulated signal on the original tape, laminating the original tape with the tape to be copied so that the magnetic surfaces of both tapes are in close contact with each other, and impressing a magnetic field on the lamination of both tapes thereby transfering the recorded signal on the original tape to the tape to be copied.

6 Claims, 16 Drawing Figures

I. ARIMURA AND
K. KURASHINA
INVENTORS

BY Stevens, Davis, Miller & Mosher
ATTORNEYS

INVENTOR

BY

ATTORNEY

INVENTOR

BY

ATTORNEY

INVENTOR

BY

ATTORNEY

FIG. 8a
FIG. 8b
FIG. 8c
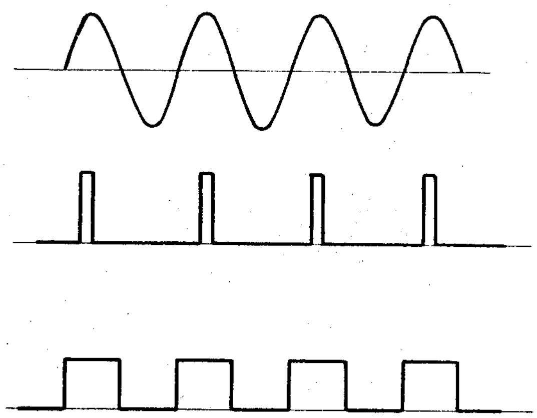
FIG. 9
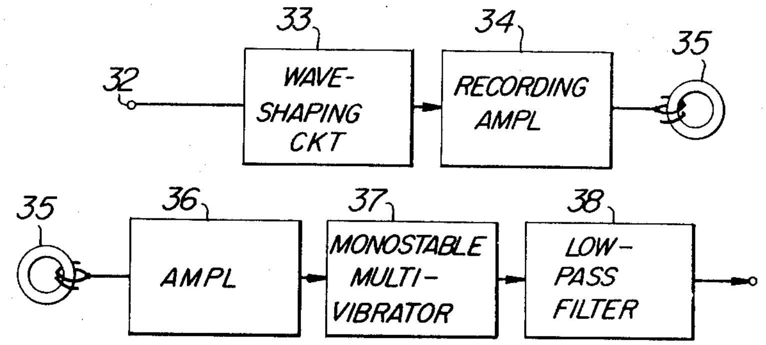
INVENTOR
BY
ATTORNEY

CONTACT-COPYING METHOD FOR REPRODUCING A MAGNETIC TAPE

This invention relates to a method of copying a recorded tape, and more particularly , to a method for producing a plurality of tapes duplicated from an original tape having a predetermined signal recorded thereon by means of a magnetic recording and reproducing system.

Conventionally, for copying a tape which is recorded with a signal having various frequency components from DC to several MHz, such as a video tape recorded by a rotating head type video recording and reproducing system (hereinafter called VTR), or whose recorded trace is slanting with respect to the longitudinal direction of the magnetic tape, a head-head method is employed in which two sets of VTR'S are operated in parallel, one reproducing information from the original tape and the other recording the information.

In accordance with this method, if the information recording time is 60 minutes, it will require 60 minutes to produce only one duplicate video tape. Accordingly, this method has a low efficiency due to its long processing time.

To eliminate this drawback, the contact-copying method has been developed in which a magnetic field is applied from outside the lamination of the recorded original tape and the unrecorded tape to be duplicated with magnetic surfaces thereof being opposite to each other, therewith transferring the signal on the original tape to the other one.

This method has an advantage in that the duplicated tape can be obtained in a short processing time, but, as described later, has a disadvantage in that the low-frequency component is hardly copied on the tape.

An object of the present invention is to obviate the defect in this contact-copying method, and to record a signal on the tape to be duplicated through converting its low-copying efficient low-frequency component into a high-copying efficient high-frequency one, thus improving the copying efficiency of the low-frequency signal component.

Another object of this invention is to provide means for making it possible for a normal VTR to reproduce the signal on the copied tape transferred from the original tape through converting the low-frequency component into a high-frequency component.

A further object of this invention is to eliminate noise components of a fixed frequency caused from the contact between a rotating head of the VTR and a video tape in the copying process.

Figure 1:
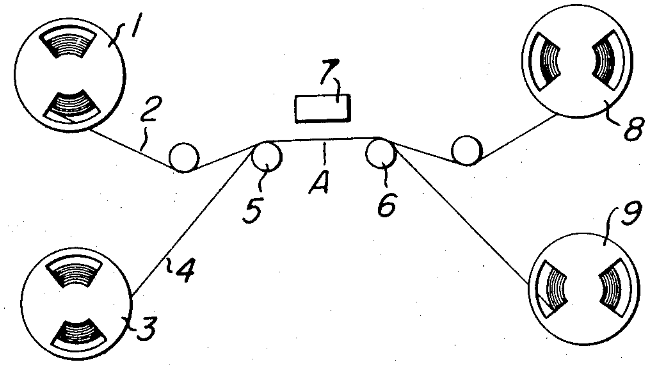
Figure 2:
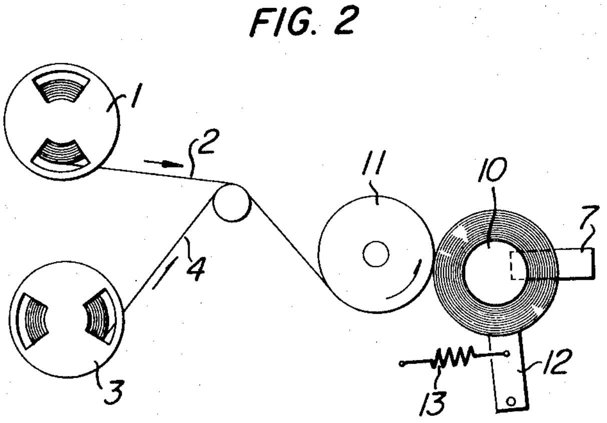
Figure 3:
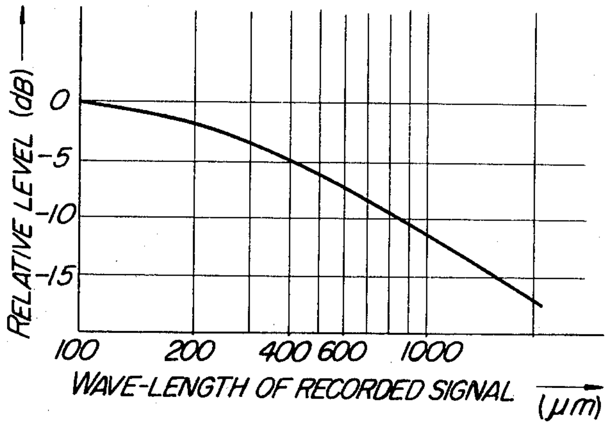
Figure 4:
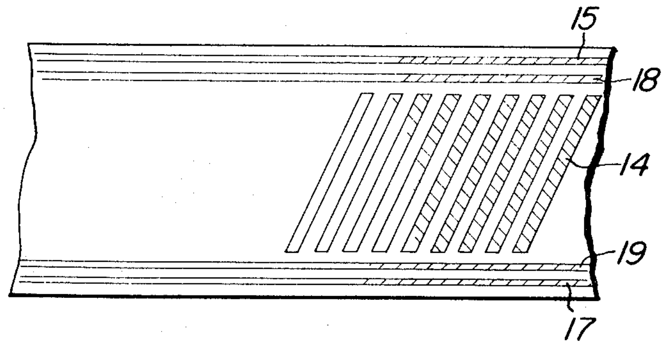
Figure 5A:
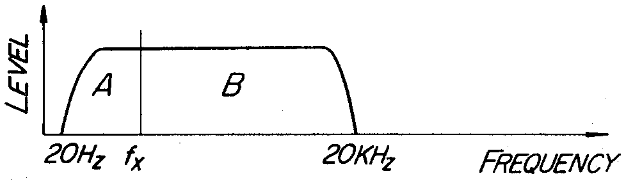
Figure 5B:
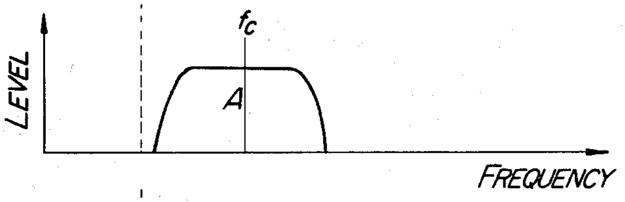
Figure 5C:
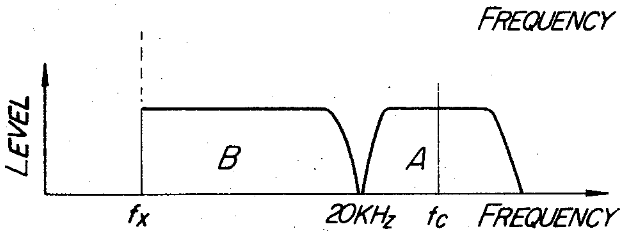
Figure 5D:
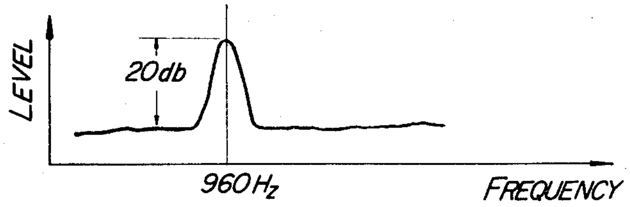
Figure 5E:
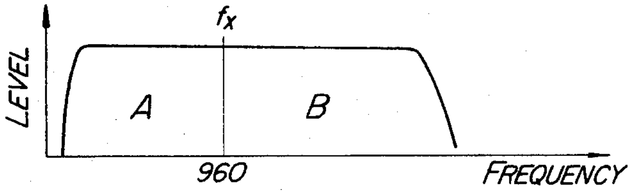
Figure 5F:
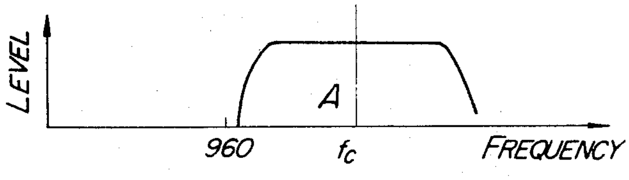
Figure 7:
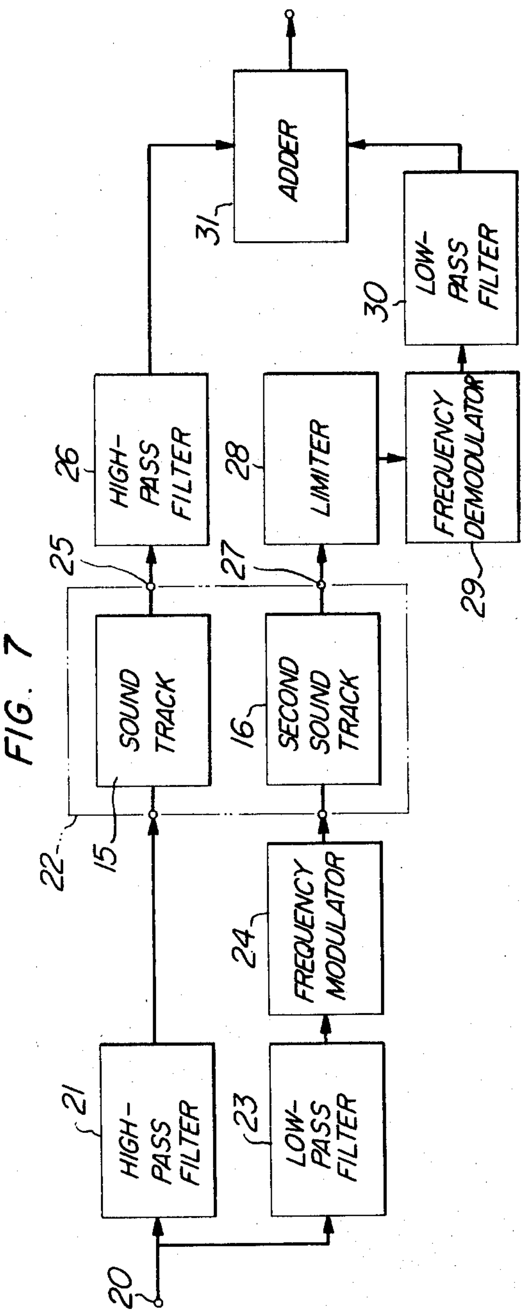
Figure 6:
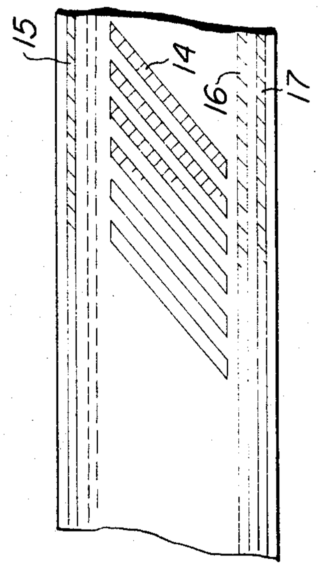

The above and other objects and features will be clarified from the following description in connection with the accompanying drawings in which:

FIGS. 1 and 2 are plane views illustrating parallel-travelling and double-winding contact-copying method respectively, FIG. 3 is a diagram showing copying characteristics as a function of wave-length of the recorded signal in the contact-copying method, FIG. 4 shown an example of a recording pattern in a rotating head type magnetic video recording and reproducing system, FIGS. 5*a* to 5 *f* are spectrum diagrams for giving an explanation of an embodiment of this invention, FIG. 6 shows a recording pattern on the original tape recorded according to the present invention, FIG. 7 is a schematic block diagram illustrating an embodiment of this invention, FIG. 8*a* to 8 *c* are diagrams showing waveforms for giving an explanation of an embodiment of this invention, and FIG. 9 is a schematic block diagram for illustrating an embodiment of this invention.

Prior to an explanation for this invention, it should be noted that there are at present two types of contact-copying methods, i.e., the parallel-travelling copying method and the double-winding copying method.

In the parallel-travelling copying method, as illustrated in Fig. 1, a recorded original tape 2 fed out of the feed-reel 1 and an unrecorded tape 4 to be duplicated fed by an other feed-reel 3 travel for a fixed length through guide pins 5 and 6 so that both magnetic surfaces are in close contact with each other while a magnetic field is applied to them from a copying magnetic field generator 7. Thereafter the tapes are wound on the respective winding reels 8, and 9.

In accordance with this method, the original tape 2 and copying tape 4 should not be different in their travelling speed at the point A to be impressed with the copying magnetic field.

Any speed difference may result in an unsatisfactory effect in the duplicating process thereby limiting the practical speed. While, in the double-winding copying method shown in Fig. 2, the recorded original tape 2 fed out of the feed-reel 1 and the unrecorded copying tape 4 fed out of the feed-reel 3 are doubled and wound on to the winding-reel 10 at a rate such that their magnetic surfaces are in close contact with each other. Then, after the tapes are wound, the copying magnetic field is applied on the wound tape being rotated at a low speed from the copying magnetic field generator 7.

This method, when copying, avoids slip between both tapes as they are wound on the winding-reel 10 thereby making it possible to obtain duplication at high speed. But it has a defect called inter-layer copying. Inter-layer copying means that a signal on one of the multi-layers of the original tape is copied not only on a layer having a magnetic surface in close contact with the former layer but also on another layer adjacent to the layer. Incidentally, in Fig. 2, 11 is a capstan, and the winding-reel 10 is mounted on the rotatable arm 12. The periphery of the tape wound on the reel is forced to be in contact with the capstan 11 by the pressure of most of the force of a spring 13, so that the doubled tapes are wound on the reel 10 according to rotation of the capstan.

The copying characteristic, that is the relation between the level of the transferred signal and the wavelength of the original signal, in the above-mentioned contact-copying method is shown in Fig. 3.

As will be understood from Fig. 3, when the wavelength of the recorded signal becomes longer, the low-frequency component, then the copying efficiency is gradually reduced. For instance, in a video-tape recorder, as shown in Fig. 4, a frequency-modulated video signal is recorded by a rotary head on a track slanting with respect to the longitudinal direction of the tape, and the sound signal is directly recorded on another track along a longitudinal direction of the tape by an A.C. bias method through a fixed head.

Accordingly, the wavelength of the video signal is generally short and relatively uniform within a range from a few microns to some hundreds of microns at the largest. Hence, even in the contact-copying method, the video signal will not be subject to the reduction in level and the effect of inter-layer copying in the double-winding method. Even if some inter-layer copying takes place, it can be readily prevented by interposing a spacer-tape between both tapes.

On the other hand, as the sound signal is directly recorded by A.C. bias method, it includes various wavelengths within a wide range from a few millimeters to some tens of micron.

Hence, the level of the sound signal is reduced when copying and remarkably affected by inter-layer copying in the double-winding copying method. Especially in the low-frequency zone, it includes a wavelength of a few millimeters so that the spacer-tape cannot practically protect the tape from being subjected to inter-layer copying.

According to the present invention, as shown in Fig. 5 *a* , the sound signal is divided at a boundary frequency $f_x$ into a low-frequency zone A, which is subject to the reduction in level by copying or the inter-layer copy, and a high-frequency zone B which does not exhibit such a problem in practice. The signal in the low-frequency zone is frequency-modulated on a carrier frequency fc to be recordable as shown in FIG. 5 *b* . Thus, the signal in the low-frequency zone A is converted to a signal having a frequency higher than the frequency $f_x$. The modulated signal is recorded on a second sound track 16 on the original tape as shown in Fig. 6, while the signal in the high-frequency zone B is recorded on the conventional sound track 15.

If a high fidelity sound head is used, the signal in the low-frequency zone A may be modulated.

Take the case of performance in an aural head to be converted to a zone A higher than the zone B as shown in Fig. 5 *c*. In this case, both signals in the zones A and B may be recorded on the same track 15 by the same magnetic head.

The boundary frequency $f_x$ between the low-frequency zone A and high-frequency zone B is determined depending on the characteristics of the magnetic tape, relative speed between the recording head and the tape, and so on.

When reproducing the sound signal from the tape after being copied, it should be clear that the original sound signal is reproduced by detecting the low-frequency component A from the frequency-modulated signal by the well known technique and mixing with the reproduced component B. The above description indicates the possibility of recording and reproducing a long-wave signal modulated by a high-frequency wave, but this method has a problem for the video tape recorder.

Generally, when recording and reproducing the signal on the travelling tape, vibration or travelling deviation, termed wow or flutter, of the tape driving system will fluctuate the modulated wave, which develops a modulation noise in the recorded signal. Hence, the reproduced signal includes a large quantity of noise compared with the original signal.

This is especially true when a 4-head type of VTR is used in broadcasting. The head of the 4-head type VTR takes 1/240 second to complete one revolution. This means that 240 × 4 tracks are scanned by the head transversely across the tape each second. As a result, the tape is subject to a vibration of 960 Hz.

Consequently, the signal reproduced from the frequency modulated signal recorded on the tape includes a noise component of 960 Hz, thereby developing a poor sound including a large quantity of noise.

FIG. 5*d* shows a noise spectrum in the sound signal demodulated from the frequency-modulated wave in the 4-head type VTR used for broadcasting.

The noise derived from the drum rotation is increase by about 20 db compared with normal white noise.

Accordingly, as indicated in FIG. 5*e*, it is necessary for the upper limit frequency, or the boundary frequency $F_x$, of the low frequency zone A to be lower than 960 Hz, so that the 960 Hz component is out of the frequency range of the modulated signal by modulating and converting to a high-frequency zone as shown in FIG. 5*f*. In other words, within the signal components which are converted to a high-frequency zone no 960 Hz component is contained, and therefore, there appears no noise of 960 Hz component in the signal which was converted to a high frequency zone and then demodulated.

The above refers to the case of a 4-head type, but for other number of heads, the boundary frequency should be determined depending on the numbers of rotation and heads.

Next, a schematic block diagram of FIG. 7 will be described. The sound signal is supplied to an input terminal 20 and fed to VRT 22 for the broadcasting purpose through a high pass filter 21, where a part of the signals which is higher than a predetermined *fx*, e.g., 960 Hz, is recorded on the sound track 15 of the VTR 22, while the remaining part of the signal which is lower than $f_x$ is fed to a frequency modulator 24 through a low-pass filter 23. The frequency modulated is arranged to modulate the signal with a carrier wave of 8 KHz and a frequency bandwidth of 3 to 13 KHz. This modulated signal is supplied to the second sound track 16, to be recorded.

When reproducing, the signal from the audio output terminal 25 is passed through a high-pass filter 26, while the signal from the output terminal of the second sound track 16 is introduced through a limiter 28 to a frequency demodulator 29. The demodulated signal is rejoined with the high-frequency component by an adder 31 after being filtered by a low-pass filter 30. Thus, a reproduced signal the same as the input one can be obtained. In the VTR 22 in use here, therefore, there will be no need for any further improvement.

Next, the case of a control signal in the rotating head type VTR will be described.

In the VTR, as is well known, in order to trace a recorded track with high fidelity when reproducing, a signal relating to the rotating phase of the rotating head at a time of recording is recorded on the edge of the tape (see FIG. 4) as the control signal.

In the Ampex tape VTR for the broadcasting use, most widely used for this purpose, the control signal of 240 c/sec is, as shown in FIG. 8*a*, customarily a sine wave. As mentioned before, it is extremely difficult to copy this control signal and, even if it could be done, its noise characteristics are not good. Accordingly, in the case of producing a master type, as in FIG. 8*b*, it may be possible to make a copy if a pulse signal consisting of high-frequency components is used as the control signal in recording. In an experiment, for the Ampex type VTR for broadcasting use, a pulse signal, each pulse having a width of 0.2 – 0.3 ms has proved to have a good effect. Alternatively, as in FIG. 8*c*, a pulse signal with a duty ratio of approximately 50:50 may be recorded on the edge of the master tape, taking into consideration the expection that the pulse signal will be changed in the copying process to a signal as shown in FIG. 8*b* by a reduction of low-frequency components.

As mentioned above, it is effective in case of contact-copying to record the pulse-formed control signal. However, if the pulse signal is used for the control signal of the original tape for copying but a sine wave signal is used for the one of the tape for normal use, the tape copied from the master tape may have such an inconvenience that it cannot be reproduced on a normal reproducer.

This invention solves this problem in the following manner.

In general, a tape rotating head type VTR for broadcasting, industrial or domestic use as shown in FIG. 4, is provided with spare tracks spaces 18, and 19 for a second sound track and a cue track in addition to the video track 14, sound track 15 and control signal track 17. These spare tracks 18, 19 are intended to be exclusively used for copying. That is, as indicated in FIG. 9, the control signal consisting of the sine wave of 240 c/s is supplied to an input terminal 32 in the normal recording, and fed to a wave shaping circuit 33 consisting of, for instance, the Schmitt circuit to be converted to a rectangular wave signal, which is further converted to a pulse signal of one polarity by a differentiating circuit, then being fed to a recording amplifier 34 to be amplified and recorded on the spare track 18 or 19 of the original tape with its pulse-formed control signal.

In reproducing, the pulse-formed control signal reproduced from the spare track on the duplicated tape is amplified by an amplifier 36, then fed to a monostable multivibrator 36, then fed to a monostable multivibrator 37 which produces a rectangular wave signal having a duty ratio of 50:50 to be converted to the sine wave control signal of240 c/s through a low-pass filter 38. This sine wave control signal is the same as the control signal in the conventional VTR, so that the VTR can be actuated according to the normal sequence. According to this method, the conventional VTR being modified with partial improvements of the control systems connected to the input and output terminals of the spare track, i.e. the addition of adapters is used only when reproducing the copied tape, and can be used for this purpose.

The above descriptions can not only be referred to the control signal, but the same techniques can be referred to the sound signal, too.

What is claimed is:

1. A method for producing a tape copied from an original tape comprising modulating low-frequency components of information signals to be recorded, which cannot be efficiently copied on the tape by a contact copying method, with a high-frequency carrier, recording said modulated signal on said original tape, laminating said original tape with the tape to be copied as the magnetic surfaces of both tapes are in close contact with each other, and impressing a magnetic field on said lamination of both tapes thereby to transfer the recorded signal on said original tape to the tape to be copied.

2. A method for producing a tape copied from an original tape according to claim 1, wherein said information signals include low-frequency components, which cannot be efficiently copied on the tape by the contact copying method, and high-frequency components, said low-frequency components being modulated with high-frequency carrier, and said modulated signal and a signal consisting of said high-frequency components are respectively recorded on different tracks of said original tape.

3. A method for producing a tape copied from an original tape according to claim 1, wherein said information signals include low-frequency components, which cannot be efficiently copied on the tape by the contact-copying method, and a high-frequency component, said low-frequency components being modulated with a high-frequency carrier and said modulated signal and a signal consisting of said high-frequency components are simultaneously recorded on the same track of said tape to be copied.

4. A method for producing a tape copied from an original tape comprising recording a video signal on a plurality of tracks slanting in the longitudinal direction of said original tape by rotating heads of a rotating head type magnetic video recording and reproducing system, separating a low-frequency components, which cannot be efficiently copied on the tape by the contact-copying method, from a sound signal, modulating said separated components with a high-frequency carrier, recording said modulated signal on said original tape, laminating said recorded original tape with said tape to be copied as the magnetic surfaces of said both tapes are in close contact with each other, and impressing a magnetic field on said laminated tapes thereby to transfer the signal on said original tape to said tape to be copied.

5. A method for producing a tape copied from an original tape according to claim 4, wherein said modulated sound signal is recorded on another space different from a normal space to be recorded with the sound signal.

6. A method for producing a tape copied from an original tape according to claim 4, wherein said low-frequency components are lower than a specific frequency which is derived from the contact between the rotating heads and the tape.

* * * * *